United States Patent
Uppström et al.

(10) Patent No.: US 11,788,915 B2
(45) Date of Patent: Oct. 17, 2023

(54) PULSE COUNTER

(71) Applicant: CEJN AB, Skövde (SE)

(72) Inventors: Daniel Uppström, Skövde (SE); Frank Rottgardt, Skövde (SE); Jörgen Ekström, Skövde (SE); Anna-Lena Olsson, Skövde (SE)

(73) Assignee: CEJN AB, Skövde (SE)

( * ) Notice: Subject to any disclaimer, the term of this patent is extended or adjusted under 35 U.S.C. 154(b) by 0 days.

(21) Appl. No.: 17/923,131

(22) PCT Filed: Apr. 28, 2021

(86) PCT No.: PCT/EP2021/061087
§ 371 (c)(1),
(2) Date: Nov. 3, 2022

(87) PCT Pub. No.: WO2021/224084
PCT Pub. Date: Nov. 11, 2021

(65) Prior Publication Data
US 2023/0118573 A1    Apr. 20, 2023

(30) Foreign Application Priority Data

May 6, 2020   (GB) ..................................... 2006683

(51) Int. Cl.
*G01L 23/06* (2006.01)
*G01L 11/02* (2006.01)
*G01L 23/02* (2006.01)

(52) U.S. Cl.
CPC .............. *G01L 23/06* (2013.01); *G01L 11/02* (2013.01); *G01L 23/02* (2013.01)

(58) Field of Classification Search
CPC .................................. G01L 23/02; G01L 23/06
See application file for complete search history.

(56) References Cited

U.S. PATENT DOCUMENTS 4,322,126 A * 3/1982 Minowa ............... G02B 6/3528
                                                              385/33
4,466,295 A * 8/1984 Wesson ................... G01L 11/02
                                                              374/188

(Continued)

FOREIGN PATENT DOCUMENTS

| FR | 2 590 019 | 5/1987 | ............... F23N 5/24 |
| WO | 2016 021104 | 2/2016 | ............... G01L 9/00 |

OTHER PUBLICATIONS

Search Report for International Application No. PCT/EP2021/061087, 11 pages.

*Primary Examiner* — Paul M. West
*Assistant Examiner* — Mark A Shabman
(74) *Attorney, Agent, or Firm* — Slayden Grubert Beard PLLC

(57) ABSTRACT

Various embodiments of the teachings herein include a pulse counter for fluid pressure changes. The pulse counter may include: a first and a second housing part with a fluid passage; a circuit board at least partially enclosed within the housing, the circuit board comprising a light pulse transmitter and a light pulse receiver; a battery at least partially within the housing, the battery supplying electric power to the light pulse transmitter and the light pulse receiver; a rod slidably arranged within the housing, with one end of the rod within the fluid passage, and a second end arranged at least partly breaking a light pulse between the light pulse transmitter and the light pulse receiver; and a spring forcing the rod away from the light pulse and towards the fluid passage.

17 Claims, 3 Drawing Sheets

(56) References Cited

U.S. PATENT DOCUMENTS

| | | | | |
|---|---|---|---|---|
| 4,878,729 A | * | 11/1989 | Stewart | G02B 6/3574 |
| | | | | 250/227.21 |
| 4,882,459 A | * | 11/1989 | Edwards, Jr. | H01H 35/38 |
| | | | | 200/82 R |
| 4,886,335 A | * | 12/1989 | Yanagawa | G02B 6/3875 |
| | | | | 250/227.21 |
| 6,125,218 A | * | 9/2000 | Humphrey | G02B 6/353 |
| | | | | 385/13 |
| 2018/0238758 A1 | * | 8/2018 | Blum | G01L 11/02 |

* cited by examiner

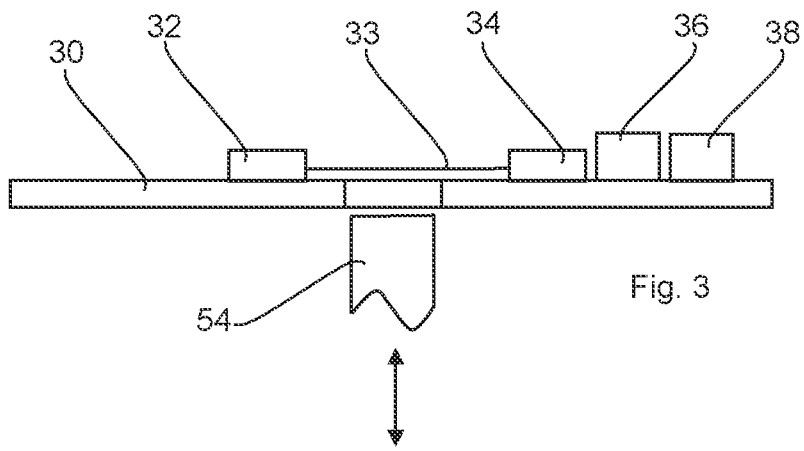
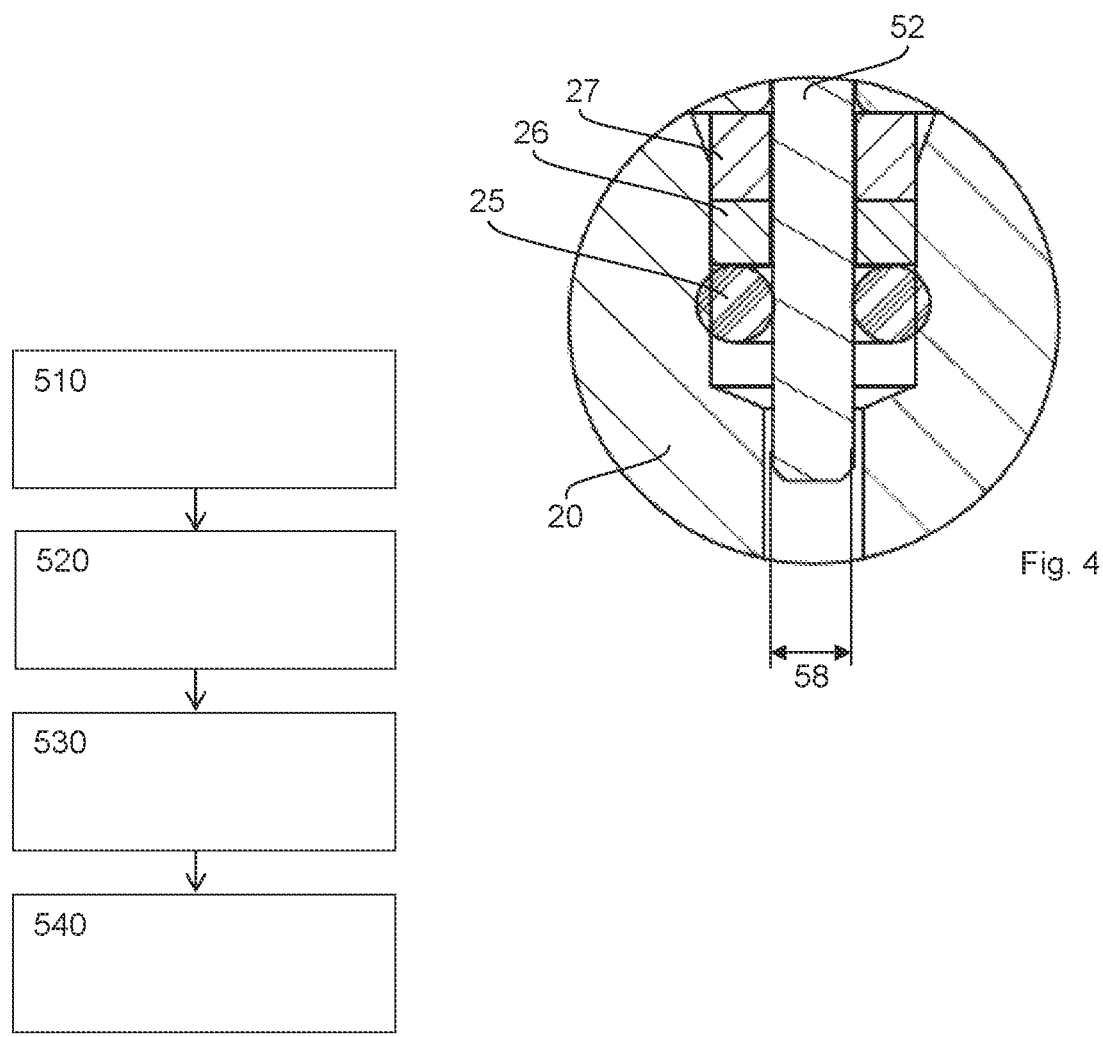

PULSE COUNTER

CROSS-REFERENCE TO RELATED APPLICATIONS

This application is a U.S. National Stage Application of International Application No. PCT/EP2021/061087 filed Apr. 28, 2021, which designates the United States of America, and claims priority to GB Application No. 2006683.3 filed May 6, 2020, the contents of which are hereby incorporated by reference in their entirety.

TECHNICAL FIELD

The present disclosure relates to pulse counters. Various embodiments of the teachings herein include systems and/or methods for counting fluid pulses.

BACKGROUND

Lately the industry has drawn its attention to counting pulses within a fluid system. For example, a hydraulic tool uses a fluid, such as air or oil, and it is useful to know how many pulses of the fluid has occurred. This indicates, for example, how many times the hydraulic tool has been used, or wear of the tool. Counting fluid pulses in a hydraulic tool can improve the maintenance of the tool. Counting fluid pulses over a certain pressure for a hose indicates wear and when it is time to replace the hose.

It is a problem how to make a pulse counter, and a method for counting pulses, adjustable so it can count different pressure pulses for different fluid systems. It is a problem how to realise a pulse counter that is modular and can be used, and adapted to, different applications. It is a problem how to realise a pulse counter that can be applied in any kind of environment. It is a problem how to realise a pulse counter, and a method for counting pulses, that can last for a long time, preferably several years, without an external energy supply.

It is also desirable to provide a pulse counter that is inexpensive to manufacture, is easy to manufacture, and is robust. The pulse counter must also be able to provide a good and reliable count of the pulses for a long time, several years. It is further a restriction that the above must be realised in a cost effective way and in a simple and robust use and manufacturing. Too cumbersome solutions cannot be realised technically or economically in real life. The present disclosure overcomes one or more of the problems as set forth above.

SUMMARY

The teachings of the present disclosure may include pulse counters and/or methods for counting a number of fluid pressure changes. For example, some embodiments include a pulse counter for fluid pressure changes, comprising: a first housing part (10); a second housing part (20) comprising a fluid passage (22), the first housing part (10) being separate from the second housing part (20); a circuit board (30) within one or both of the two housing parts (10, 20), the circuit board (30) comprising a light pulse transmitter (32) and a light pulse receiver (34); a battery (40) within one or both of the two housing parts (10, 20), electric power being suppliable from the battery (40) to the light pulse transmitter (32) and the light pulse receiver (34); a rod (50) slidably arranged within the first housing part (10) and the second housing part (20), with one end (52) of the rod (50) within the fluid passage (22), and another end (54) of the rod (50) arranged for at least partly breaking a light pulse (33) between the light pulse transmitter (32) and the light pulse receiver (34); and a spring (60) forcing the rod (50) away from the light pulse (33) and towards the fluid passage (20).

In some embodiments, the light pulse (33) between the light pulse transmitter (32) and the light pulse receiver (34) is sent less frequently than once every second.

In some embodiments, the duration of the light pulse (33) is less than one micro second.

In some embodiments, the circuit board (30) further comprises a memory (36) for storing the number of pulses, and a near field communication, NFC, component (38) for reading the content of the memory (36); and/or wherein the pulse counter is configured to communicate directly, or indirectly, and electronically with external equipment to which the pulse counter is attachable for counting pulses.

In some embodiments, the rod (50) comprises an extension (56), and one end (62) of the spring (60) engages the extension (56) and another end (64) of the spring (60) engages the first housing part (10).

In some embodiments, the light pulse (33) between the light pulse transmitter (32) and the light pulse receiver (34) is sent once every third second, or less frequently, and the duration of the light pulse is less than one nano second.

In some embodiments, the one end (52) of the rod (50) within the fluid passage (22) is sealed off from the first housing part (10), or the second housing part (20), by an o-ring (25) and at least one back up ring (26, 27).

In some embodiments, the pulse counter includes a second light pulse transmitter and a second light pulse receiver for transmitting and receiving a second light pulse, the second light pulse being arranged for the another end (54) of the rod (50) to at least partly break the second light pulse after the another end (54) broke the first light pulse (33).

In some embodiments, the pulse counter is configured for indicating an amount of a partly broken light pulse (33) as a pressure level in the fluid passage (22), and the amount of the partly broken light pulse (33) and/or the pressure level are/is stored in the memory (36).

In some embodiments, the first housing part (10) and the second housing part (20) are releasably connectable with each other; and/or wherein the circuit board (30) and the battery (40) are within the first housing part (10), and the second housing part (20) comprises means (24) to be attachable to a fluid system.

In some embodiments, the memory (36) is further configured to store an identification, ID, of the pulse counter, minimum and maximum temperature, and/or remaining days of battery use; and the memory (36) is a non-volatile memory (36).

In some embodiments, the battery (40) is a standard battery according to the international standard IEC 60086-3:2016.

In some embodiments, the pulse counter includes setting (510) the pressure level that moves the rod (50) to at least partly break the light pulse (33) by setting the force of the spring (60) and by selecting a diameter (58) of the end (52) of the rod (50) within the fluid passage (20).

In some embodiments, the pulse counter comprises a memory (36) for storing the number of pulses, and a near field communication, NFC, component (38) for reading the content of the memory, the method further comprising storing (520) in the memory (36) the number of times the rod (50) at least partly breaks the light pulse (33); and reading (530) the number with an external device using the NFC component (38).

In some embodiments, the pressure level of the counted fluid pulses are measured by an amount of a partly broken light pulse (33), and the amount of the partly broken light pulse (33) and/or the pressure level are/is stored in the memory (36).

In some embodiments, the method further includes extending (540) the battery life of the pulse counter by sending the light pulse (33) between the light pulse transmitter (32) and the light pulse receiver (34) less frequent than once every second second, and setting the duration of the light pulse (33) less than one micro second, or wherein the light pulse (33) between the light pulse transmitter (32) and the light pulse receiver (34) is sent once every third second, or less frequently, and the duration of the light pulse is less than one nano second.

BRIEF DESCRIPTION OF THE DRAWINGS

The accompanying drawings illustrate exemplary embodiments of the disclosure, and together with the general description given above and the detailed description of the embodiments given below, serve to explain, by way of example, the principles of the disclosure.

FIG. 3 is a diagrammatic illustration of the circuit board and a part of the rod of the pulse counter in FIG. 1;

FIG. 4 is a diagrammatic illustration of a detail in FIG. 2 incorporating teachings of the present disclosure; and FIG. 5 is a diagrammatic illustration of a method for counting pulses incorporating teachings of the present disclosure.

DETAILED DESCRIPTION

Figure 1:
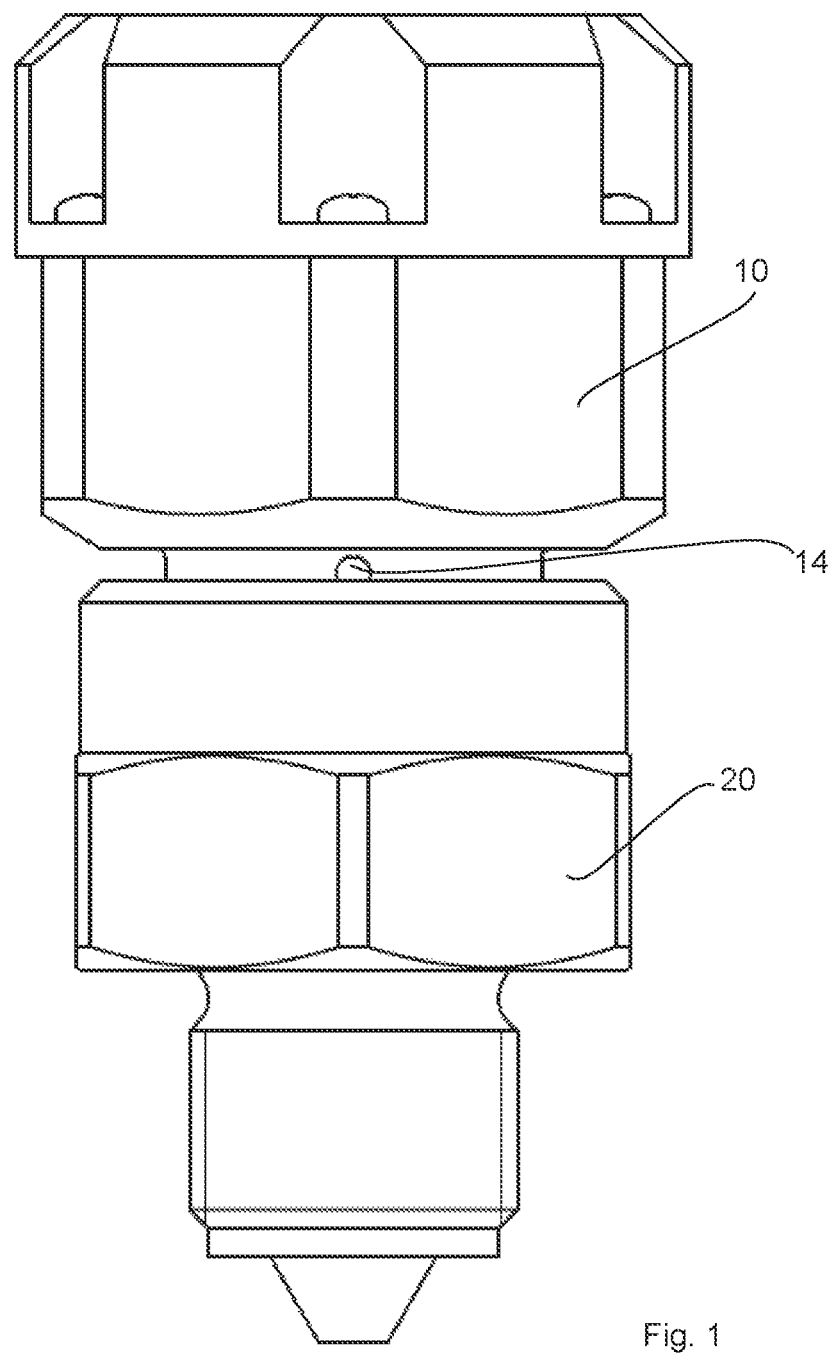
FIG. 1 is a diagrammatic illustration of a pulse counter incorporating teachings of the present disclosure.

In some embodiments of the teachings herein, a pulse counter comprises a first housing part 10; a second housing part 20 comprising a fluid passage 22, the first housing part 10 being separate from the second housing part 20; a circuit board 30 within one or both of the two housing parts 10, 20, the circuit board 30 comprising a light pulse transmitter 32 and a light pulse receiver 34; a battery 40 within one or both the two housing parts 10, 20, the battery 40 being able to supply electric power to, at least, the light pulse transmitter 32 and the light pulse receiver 34; a rod 50 slidably arranged within the first housing part 10 and the second housing part 20, with one end 52 of the rod 50 within the fluid passage 22, and another end 54 of the rod 50 arranged for breaking at least partly a light pulse 33 between the light pulse transmitter 32 and the light pulse receiver 34; and a spring 60 forcing the rod 50 away from the light pulse 33 and towards the fluid passage 20.

In some embodiments, the light pulse 33 between the light pulse transmitter 32 and the light pulse receiver 34 is sent less frequently than once every second second. In some embodiments, the duration of the light pulse 33 is less than one micro second. In some embodiments, the light pulse 33 between the light pulse transmitter 32 and the light pulse receiver 34 is sent once every third second, or less frequently, and the duration of the light pulse is less than one nano second.

In some embodiments, the circuit board 30 further comprises, at least, a memory 36 for storing the number of pulses, and a near field communication, NFC, component 38 for reading the content of the memory 36. In some embodiments, the pulse counter is configured to communicate directly, or indirectly, and electronically with external equipment to which the pulse counter is attachable for counting pulses.

In some embodiments, the rod 50 comprises an extension 56, and one end 62 of the spring 60 engages the extension 56 and another end 64 of the spring 60 engages the first housing part 10. The one end 52 of the rod 50 within the fluid passage 22 may be sealed off from the first housing part 10, or the second housing part 20, by an o-ring 25 and at least one back up ring 26, 27.

In some embodiments, the pulse counter may further comprise a second light pulse transmitter and a second light pulse receiver for transmitting and receiving a second light pulse, the second light pulse being arranged for the another end 54 of the rod 50 to break the second light pulse after the another end 54 broke the first light pulse 33.

In some embodiments, the pulse counter is configured for indicating an amount of a partly broken light pulse (33) as a pressure level in the fluid passage (22), and the amount of the partly broken light pulse (33) and/or the pressure level are/is stored in the memory (36).

In some embodiments, the first housing part 10 and the second housing part 20 are releasably connectable with each other. The circuit board 30 and the battery 40 may be within the first housing part 10, and the second housing part 20 comprises means 24 to be attachable to a fluid system.

In some embodiments, the memory 36 is further configured to store an identification, ID, of the pulse counter, minimum and maximum temperature, and/or remaining days of battery use; and the memory 36 may be a nonvolatile memory 36. In some embodiments, the battery 40 is a standard battery according to the international standard IEC 60086-3 (2016).

In some embodiments, a method for counting fluid pulses using a pulse counter comprises setting 510 the pressure level that moves the rod 50 to break the light pulse 33 by setting the force of the spring 60 and by selecting a diameter 58 of the end 52 of the rod 50 within the fluid passage 20.

In some embodiments, the pulse counter comprises a memory 36 for storing the number of pulses, and a near field communication, NFC, component 38 for reading the content of the memory, and the method comprises further storing 520 in the memory 36 the number of times the rod 50 breaks the light pulse 33; and reading 530 the number with an external device using the NFC component 38.

In some embodiments, the pressure level of the counted fluid pulses are measured by an amount of a partly broken light pulse (33), and the amount of the partly broken light pulse (33) and/or the pressure level are/is stored in the memory (36).

In some embodiments, the method further comprises extending 540 the battery life of the pulse counter by sending the light pulse 33 between the light pulse transmitter 32 and the light pulse receiver 34 less frequent than once every second second, and setting the duration of the light pulse 33 less than one micro second, e.g. wherein the light pulse 33 between the light pulse transmitter 32 and the light pulse receiver 34 is sent once every third second, or less frequently, and the duration of the light pulse is less than one nano second.

In some embodiments, a pulse counter, and a method for counting pulses, is adjustable so that different pressure pulses for different fluid systems may be counted. In some embodiments, a pulse counter is modular and can be used, and adapted to, different applications. Such a pulse counter can be applied and used in any kind of environment. In some embodiments, a pulse counter, and a method for counting pulses, that can last for a long time, e.g. several years, without external energy supply. Accordingly, such pulse counters can be safe, robust, cost effective, and simple to manufacture. Further advantages and technical effects of the embodiments are described herein.

Other technical advantages of the present disclosure will be readily apparent to one skilled in the art from the following description, figures, and claims. Various embodiments of the present application obtain only a subset of the advantages set forth. No one advantage is critical to the embodiments. Any embodiment disclose herein may be combined with any other embodiment disclosed herein.

DETAILED DESCRIPTION

Figure 2:
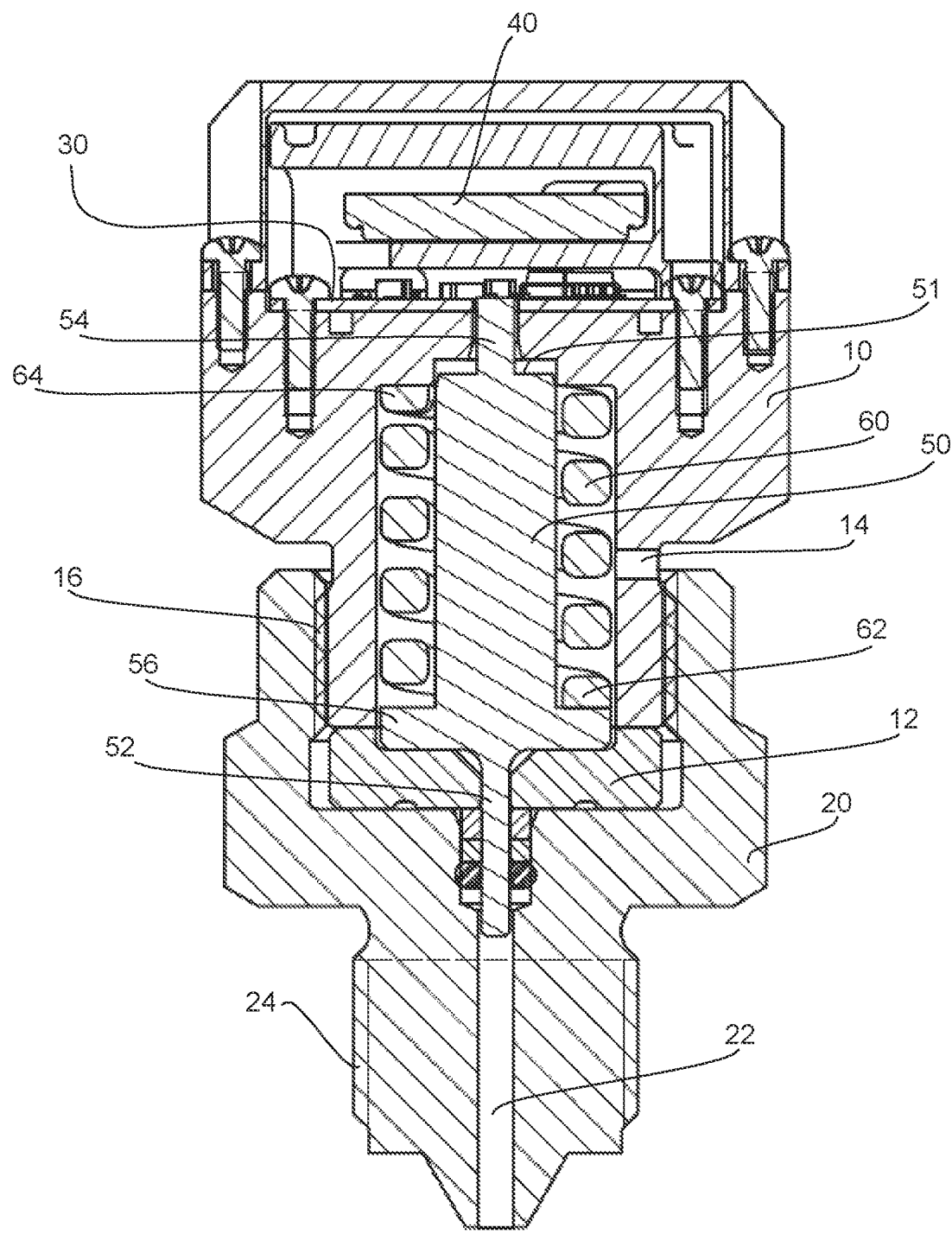
FIG. 2 is a diagrammatic illustration of a cut through the axis of the pulse counter in FIG. 1.

FIGS. 1 to 4 illustrate an exemplary embodiment of a pulse counter incorporating teachings of the present disclosure. The pulse counter is for counting the number of fluid pulses, fluid pressure changes, e.g. a number of pressure increases in the fluid. The fluid may be a gas and/or a liquid, for example air, oil, or hydraulic fluid. The pulse counter comprises a first housing part 10 and a second housing part 20. The second housing part 20 comprises a fluid passage 22. The fluid passage 22 is thus for gas and liquid. The fluid passage 22 may only be in the second housing part 20, not within the first housing part 10. The two housing parts 10, 20 are two separate parts, individual elements. The two housing parts 10, 20 may be connected to each other, for example by a screw connection 16.

The two housing parts 10, 20 may form together the outer housing of the pulse counter with an inner opening for the following features within the pulse counter.

The pulse counter comprises a circuit board 30 within one or both of the two housing parts 10, 20. The circuit board 30 may be in, inside, only one of the two housing parts 10, 20, or in both, but preferably completely inside the first housing part 10. The circuit board 30 comprising a light pulse transmitter 32 and a light pulse receiver 34. The light pulse transmitter 32 can send a light pulse, which is in turn received by the light pulse receiver 34. The light pulse transmitter 32 sends thus a light pulse 33 that only last for a very short time and is received by the light pulse receiver 34.

The pulse counter comprises a battery 40 within one or both of the two housing parts 10, 20. The battery 40 may be a button battery 40, e.g. a standard button battery 40. The battery 40 may be may be in, inside, only one of the two housing parts 10, 20, or in both. The battery 40 supplies electric power to the light pulse transmitter 32 and the light pulse receiver 34. The battery 40 may supply power to other parts of the circuit board 30 as well.

The pulse counter comprises a rod 50. The rod 50 may be substantially cylindrical, an axial protrusion, a bar, a stick, e.g. in metal and a separate single part. The rod 50 is slidably arranged between and within the first housing part 10 and the second housing part 20, with one end 52 of the rod 50 within the fluid passage 22, and another end 54 of the rod 50 arranged for being able to break a light pulse 33 between the light pulse transmitter 32 and the light pulse receiver 34. The rod 50 may be round and may have a thicker part in the middle and with the two ends 52, 54 being thinner. The rod 50 is slidably arranged within the space of the two housing parts 10, 20. In some embodiments, the rod 50 may have a shoulder 51 limiting axial movement of the rod 50. The shoulder 51 may act as a stop to limit the movement of the rod 50 in the direction against the force of the spring 60, upwards, in FIG. 2. In this way the pressure in the fluid passage cannot damage the pulse counter.

The pulse counter comprises a spring 60 forcing the rod 50 away from the light pulse 33 and towards the fluid passage 20. The spring 60 may be coiled around the rod 50, preferably around the thicker part of the rod 50. The spring 60 may force, by its expanding spring force, the one end 52 of the rod 50 into the fluid passage 22. The spring 60 may be a metal coil spring. A second spring may also be added, for example by having two springs, one inner and one outer, coaxially around the rod 50, or having two springs, one after the other, with the same diameter axially arranged coaxially around the rod 50. Such an arrangement with two springs with each a different spring force could be used to sense a pressure interval, or two differently strong fluid pulses, two different pressure levels.

The pulse counter may count the fluid pulses and functions in the following way. The pulse counter may be connected to a fluid system so that the fluid passage 22 is in fluid communication with the fluid system. An increase in pressure of the fluid in the fluid passage 22 forces the one end 52 of the rod 50 against, upwards in FIG. 2, the force of the spring 60. When the rod 50 moves axially against the force of the spring 60, upwards in FIG. 2, then the another end 54 of the rod 50 enters between the light pulse emitter 32 and the light pulse receiver 34 to at least partly break the light pulse 33. A light pulse 33 that is at least partly shadowed, or completely broken, counts as one fluid pulse, as one pressure pulse. Consecutive shadowed, or broken, light pulse pulses 33 may be registered as one and the same pressure pulse. A non-shadowed, or non-broken, light pulse 33 may be required to be received by the light pulse receiver 34 before a new fluid pulse may be counted. The rod 50 is forced by a fluid pulse against the spring 60, and if the fluid pulse is strong enough, then the rod 50 shadows partly, or breaks, intermittently the light pulse 33 and the fluid pulse of the fluid system is registered. The rod 50 may thus break the light pulse 33 completely or only a portion, in the radial direction, of the light pulse 33 may be shadowed, broken.

In some embodiments, the pulse counter may be configured to use the proportion of the at least partly broken light pulse 33 as an indication of the pressure of the pressure pulse. The rod 50 may at least partly break, enter, the light pulse 33, or the rod 50 may completely break the light pulse 33. The another end 54 of the rod 50 may enter, block, just a part of the light pulse 33 proportional to the pressure in the fluid passage 22. If the fluid pressure at the one end 52 of the rod 50 is at a certain pressure, then the another end 54 may shadow the light pulse 33 to a certain extent. If the fluid pressure at the one end 52 of the rod 50 is higher than that certain pressure, then the another end 54 may shadow the light pulse 33 to a larger certain extent. The extent that gets shadowed is proportional to the fluid pressure. That is, a shadowed part of the light pulse 33 by the rod 50 indicates not only a fluid pressure change, but also indicates proportionally how large the fluid pressure change is in the fluid passage 22.

In some embodiments, the light pulse 33 between the light pulse transmitter 32 and the light pulse receiver 34 is sent less frequently than once every second, every other, second. The light pulse 33 may be sent less frequently than once every second, or once every second second, or once every third second, or once every fourth second, or once every fifth second, or less frequently. In some embodiments, the duration of the light pulse 33 is less than one micro second. The light pulse pulse 33, the duration of the light pulse 33, may be less than one centi second, or may be less than one milli second, or may be less than one micro second, or less than one nano second, or may be less than one pico second. In some embodiments, the light pulse 33 between the light pulse transmitter 32 and the light pulse receiver 34 is sent once every third second, or less frequently, and the duration of the light pulse is less than one nano second. The technical effect of this is that the batter 40, for example the standard battery 40, will last for very long, several years, for example at least five years, for the pulse counter while all the pressure pulses are still detected and counted accurately. There will be no need for an external power supply.

In some embodiments, the circuit board 30 further comprises a memory 36 for storing the number of pulses, and a near field communication, NFC, component 38 for reading the content of the memory 36. See FIG. 3 in this regard. The memory 36 may additionally store an identity number of the pulse counter, and a minimum and/or a maximum temperature of the pulse counter. The memory 36 may be read by a user via the NFC component 38, for example with a mobile phone, or other device, having NFC capabilities. Hereby the number of pulses, as well as other data, ID and temperatures, may be read from the pulse counter. The memory 36 may also store how many days are left of the battery 40. For example, the average usage of energy of the pulse counter from the battery 40 may be used to calculate the remaining days of battery use, i.e. how many days the battery 40 can still give energy to the pulse counter. Hereby a user can plan and take into account a battery 40 change for the pulse meter. The memory 36 may be a non-volatile memory 36 and store the data in the memory 36 independently from energy of the battery. Hereby the memory 36 can still be read even if the battery 40 has no more energy.

In some embodiments, the pulse counter is configured to communicate directly, or indirectly, and electronically with external equipment to which the pulse counter is attachable for counting pulses. In this way the pulse counter can count the fluid pulses in such an external equipment, and then tell such an external equipment how many fluid pressure pulses has occurred within such an external equipment.

In some embodiments, the rod 50 comprises an extension 56. The extension 56 may be in the form of a flange 56 around the rod 50. One end 62 of the spring 60 may engage the extension 56 and another end 64 of the spring 60 may engage the first housing part 10. The spring 60 may be coiled around the rod 50, or located next to the rod 50. The spring 60 pushes the extension 56 away from the circuit board 30, that is away from the light pulse transmitter 32 and the light pulse receiver 34, and towards the fluid passage 22. The spring force of the spring 60 acts against the fluid pressure of the fluid in the fluid passage 22. When the fluid pressure of the fluid in the fluid passage becomes large than the spring force of the spring 60, then the fluid pressure, the fluid pulse, moves the slidable rod 50 against the spring 60 to break the light pulse 33.

In some embodiments, the one end 52 of the rod 50 within the fluid passage 22 is sealed off from the first housing part 10, or the second housing part 20, by an o-ring 25 and at least one back up ring 26, 27. Two back up rings 26, 27 may be used. One back up ring may be a polytetrafluoroethylene, PTFE, ring 26, and one back up ring may be a polyoxymethylene, POM, ring 27. The PTFE ring 26 may be next to, for example in contact with, the o-ring 25. The POM ring 27 may be next to, for example in contact with the PTFE ring 26. The order, seen from the fluid passage 22, of the rings may be the o-ring 25, the PTFE ring 26, and the POM ring 27. The one end 52 of the rod 50 may be sealed off from the inside of the pulse counter, the inside formed by the two housing parts 10, 20, and with the seal, the o-ring 25 and the at least one back up ring 26, 27, being in the second housing part 20, preferably facing the fluid passage 22.

In some embodiments, the pulse counter further comprises a second light pulse transmitter and a second light pulse receiver for transmitting and receiving a second light pulse. The second light pulse may be arranged for the another end 54 of the rod 50 to at least partly, break the second light pulse after the another end 54 broke the first light pulse 33. The another end 54 may break intermittently the second light pulse, after breaking the first light pulse. The second light pulse is thus arranged in the axial direction of the rod 50 on top of the first light pulse, see FIG. 2, so that a further extension, beyond the first light pulse 33, of the rod 50 can be registered, first by the light pulse 33, then by the second light pulse. In this way a range of a fluid pressure level can be counted, i.e. the fluid pressure must be high enough to at least partly break the first light pulse 33, but not the second light pulse. Furthermore, the second light pulse can be used in addition to the first light pulse 33 to achieve a greater range of light pulses to decide the proportion to which the rod 50 at least partly breaks the light pulses. In some embodiments, this allows for counting fluid pulses of two different pressure levels.

In some embodiments, the first housing part 10 and the second housing part 20 are releasably connectable with each other. The releasable connection may be threads 16 on the two housing parts 10, 20. Such a releasable connection, for example a screw connection, allows easy assembly of the pulse counter. Such a releasable connection may also allow that the spring 60 can be changed, that is adjusted, so that the pulse counter is adjusted for counting a different pulse pressure. This may allow the pulse pressure to be set for a selected pulse pressure. This may also allow for the rod 50 to be inserted into the pulse counter.

In some embodiments, the first or second housing part 10, 20 comprises an opening 14 to allow air in and out of, to vent, the interior of the pulse counter. Thus, the pulse counter may, for example, communicate air through the opening 14 from the inside to the outside of the pulse counter. This avoids any interior pressure of fluid to build up inside the pulse counter. The opening 14 may also reduce the amount of condensation, moisture, that could affect the circuit board (30) and its components, or could result in corrosion inside of the pulse counter. The opening 14 may be covered with a membrane that only allows moisture to exit, such as for example GORETEX™. Such a membrane would prevent liquid, water, to enter the pulse meter, but allow air to escape the pulse meter.

In some embodiments, the first housing part 10 together with the second housing part 20 form an interior opening for the rod 50 with the extension 56 and the spring 60. The pulse counter may further comprise a support 12, best seen in FIG. 2. The support 12 may be held, clamped, between the first housing part 10 and the second housing part 20. The extension 56, and/or a part of the rod 50, may be pushed by the spring 60 against the support 12. The support 12 may also hold the o-ring 25 and the one or more back up rings 26, 27 in place in the second housing part 20. This allows for a robust pulse counter and an easy assembly and reduction of wear.

In some embodiments, the circuit board 30 and the battery 40 are within the first housing part 10. The circuit board 30 and the battery 40 may be only and completely within, inside, the first housing part 10. The second housing part 20 may comprise means 24 to be attachable to a fluid system. The means 24 may be threads 24. In this way the second housing part 20 comprises means to be attachable to an external fluid passage, or a fluid source, or a hydraulic tool or machine.

In some embodiments, the memory 36 is further configured to store an identification, ID, of the pulse counter, minimum and/or maximum temperature, and/or remaining days of battery use. An ID allows the pulse counter to be identified and allocated to a specific fluid system. The minimum and/or maximum temperature may be the minimum and maximum temperature measured by a temperature sensor of the pulse counter during the use of the pulse counter. Given the average battery energy used, the remaining days of battery use can be estimated. A user reading the pulse counter may see the remaining days of battery use and knows therefore when it is time to change battery, or the complete pulse meter. This allows for an efficient maintenance and replacement of the pulse counter, as well as providing relevant data for simple use of the pulse counter.

In some embodiments, the memory 36 is a non-volatile memory 36. The data in the memory 36 remains even when the energy of the battery 40 ends, and the data can be read after a battery change.

In some embodiments, the battery 40 is a standard battery 40, preferably a standard button battery 40, according to the international standard IEC 60086-3. IEC 60086-3:2016 defines an alphanumeric coding system for button batteries, for example CR2032, SR516, and LR1154. The use of a standard battery, instead of a custom made battery, is that the pulse counter becomes inexpensive, and it is easy to get a new battery and to replace the battery 40. Pulse counters in the prior art have special custom batteries, or external power supply. A pulse counter that can use standard components are preferred over a pulse counter that needs customs components.

In some embodiments, a method for counting fluid pulses using a pulse counter according to any one of the preceding embodiments is disclosed, see FIG. 5. The method comprises setting 510 the pressure level, that moves the rod 50 to break the light pulse 33, by setting, adjusting, the force of the spring 60 and by selecting, adjusting, the diameter 58 of the end 52 of the rod 50 within the fluid passage 20. Changing the spring to another spring with a different spring force sets the pressure level at which the rod 50 moves against the spring and breaks the light pulse 33.

By selecting, setting, the diameter 58 of the end 52 of the rod 50 also sets the pressure level at which the rod 50 moves against the spring and breaks the light pulse 33. For example, a large diameter 58 of the rod 50 results in a lower fluid pressure moving the rod 50 compared with a smaller diameter 58 of the rod 50 and the same spring force. The diameter 58 of the end 52 of the rod 50 may best be taken from FIG. 4. The pressure level of the fluid pulses that are to be counted by the pulse counter can thus be set by the spring force of the spring 60 and the diameter 58 of the end 52 of the rod 50 within the fluid passage 20. In addition hereto, or as an alternative, the pressure level of the counted fluid pulses are measured by an amount of a partly broken light pulse (33), and the amount of the partly broken light pulse (33) and/or the pressure level are/is stored in the memory (36).

In some embodiments, the pulse counter comprises a memory 36 for storing the number of pulses, and a near field communication, NFC, component 38 for reading the content of the memory. The method may further comprise storing 520 in the memory 36 the number of times the rod 50 breaks the light pulse 33; and reading 530 the number with an external device using the NFC component 38. When the fluid pressure in the fluid passage 22 increases and overcomes the spring force of the spring 60, then the rod 50 breaks the light pulse 33 and a pulse is counted and added to the number of pulses stored in the memory 36. Several consecutive pulses may be counted as one fluid pulse.

In some embodiments, the method may further comprise extending 540 the battery life of the pulse counter by sending the light pulse 33 between the light pulse transmitter 32 and the light pulse receiver 34 less frequent than once every second second, and setting the duration of the light pulse 33 less than one micro second.

In some embodiments, the light pulse 33 between the light pulse transmitter 32 and the light pulse receiver 34 is sent once every third second, and the duration of the light pulse is less than one nano second. In some embodiments, the light pulse 33 is sent less frequently than once every third, fourth, or fifth second, and for a duration of less than a milli, micro, nano, piko, or femto second. By sending the light pulse 33 so infrequently the battery 40 last very long, several years, at least 5 years. A fluid pulse in a fluid system may exist during a period of time that is longer than the frequency that the light pulse 33 is transmitted and received.

The steps of the method, and of different embodiments of the method, may be taken in any order. FIG. 5 illustrates them in a specific order, but the steps can be taken in any order as long as it makes technical sense.

In some embodiments, a method may be used for measuring two different fluid pulses, each with a different pressure level. When using two light pulses, one on top of the other with reference to FIG. 2, and as described above, a pressure interval, or two differently strong pulses, could be counted by the pulse counter. In this way a range of a fluid pressure level can be counted, i.e. the fluid pressure must be high enough to at least partly break the first light pulse 33, but not the second light pulse. Furthermore, the second light pulse can be used in addition to the first light pulse 33 to achieve a greater range of light pulses to decide the proportion to which the rod 50 at least partly breaks the light pulses.

A second spring may also be added, for example by having two springs, one inner and one outer, coaxially around the rod 50, or having two springs, one after the other, with the same diameter axially arranged coaxially around the rod 50. Such an arrangement with two springs with each a different spring force could be used to sense a pressure interval, or two differently strong pulses. A certain fluid pressure pulse may compress a first spring, but unless the fluid pressure pulse is large enough, the second spring may not be compressed.

It will be apparent to those skilled in the art that various modifications and variations can be made to the disclosed apparatus and method. Other embodiments will be apparent to those skilled in the art from consideration of the specification and practice of the disclosed apparatus and method. It is intended that the specification and examples be considered as exemplary only, with a true scope being indicated by the following claims and their equivalents.

LIST OF ELEMENTS 10 first housing part
12 support
14 opening
16 threads
20 second housing part
22 fluid passage
24 thread 25 o-ring
26 first back-up ring
27 second back-up ring
30 circuit board
32 light pulse transmitter
33 light pulse
34 light pulse receiver
36 memory
38 NFC
40 battery
50 rod
51 shoulder
52 one end of the rod
54 the other end of the rod
56 extension of the rod
58 diameter of one end of the rod
60 spring
62 one end of the spring
64 the other end of the spring
500 method step, setting the pressure level
520 method step, storing pulses in the memory
530 method step, reading the memory
540 method step, extending battery life

The invention claimed is:

1. A pulse counter for fluid pressure changes, the pulse counter comprising:
   a first housing part;
   a second housing part with a fluid passage, the first housing part separate from the second housing part;
   a circuit board at least partially enclosed within one or both of the two housing parts, the circuit board comprising a light pulse transmitter and a light pulse receiver;
   a battery at least partially within one or both of the two housing parts, the battery supplying electric power to the light pulse transmitter and the light pulse receiver;
   a rod slidably arranged within the first housing part and the second housing part, with one end of the rod within the fluid passage, and a second end arranged to at least partly break a path for a light pulse between the light pulse transmitter and the light pulse receiver any time a pressure within the fluid passage exceeds a threshold; and
   a spring forcing the rod away from the light pulse and towards the fluid passage, wherein a force exerted by the spring at least partially defines the threshold.

2. The pulse counter according to claim 1, wherein the light pulse transmitter issues a light pulse toward the light pulse receiver less frequently than once every other second.

3. The pulse counter according to claim 1, wherein a duration of the light pulse is less than one micro second.

4. The pulse counter according to claim 1, wherein the circuit board further comprises:
   a memory for storing a number of light pulses reaching the light pulse receiver; and
   a near field communication (NFC) component for reading content of the memory;
   wherein the pulse counter is configured to communicate with external equipment to which the pulse counter is attachable for counting pulses.

5. The pulse counter according to claim 4, wherein the pulse counter indicates an amount of a partly broken light pulse as a pressure level in the fluid passage, and the memory stores an amount of the partly broken light pulse and/or the pressure level.

6. The pulse counter according to claim 4, wherein the memory stores an identification of the pulse counter, minimum and maximum temperature, and/or remaining days of battery use; and
   the memory is a non-volatile memory.

7. The pulse counter according to claim 1, wherein the rod comprises an extension;
   wherein one end of the spring engages the extension; and another end of the spring engages the first housing part.

8. The pulse counter according to claim 1, wherein:
   the light transmitter emits a light pulse toward the light pulse receiver once every third second, or less frequently; and
   the duration of the light pulse is less than one nano second.

9. The pulse counter according to claim 1, wherein the one end of the rod within the fluid passage is sealed off from the first housing part or the second housing part, by an o-ring and at least one back up ring.

10. The pulse counter according to claim 1, further comprising a second light pulse transmitter and a second light pulse receiver for transmitting and receiving a second light pulse;
    wherein the second light pulse is arranged for the another end of the rod to at least partly break the second light pulse after the another end broke the first light pulse.

11. The pulse counter according to claim 1, wherein:
    the first housing part and the second housing part are releasably connectable with each other;
    the circuit board and the battery are within the first housing part; and
    the second housing part comprises means to attach to a fluid system.

12. The pulse counter according to claim 1, wherein the battery comprises a standard battery according to the international standard IEC 60086-3:2016.

13. A method for counting fluid pulses using a pulse counter comprising a first housing part, a second housing part with a fluid passage, the first housing part separate from the second housing part, a circuit board at least partially enclosed within one or both of the two housing parts, the circuit board comprising a light pulse transmitter and a light pulse receiver, a battery at least partially within one or both of the two housing parts, the battery supplying electric power to the light pulse transmitter and the light pulse receiver, a rod slidably arranged within the first housing part and the second housing part, with one end of the rod within the fluid passage, and a second end arranged to at least partly break a path for a light pulse between the light pulse transmitter and the light pulse receiver any time a pressure within the fluid passage exceeds a threshold, and a spring forcing the rod away from the light pulse and towards the fluid passage, the method comprising:
    setting a required the pressure level to move the rod into the path by setting the force of the spring and by selecting a diameter of the end of the rod within the fluid passage.

14. The method of claim 13, wherein:
    the pulse counter comprises a memory for storing the number of pulses, and a near field communication (NFC) component for reading the content of the memory; and
    the method further comprises:
    storing in the memory a number of times the rod at least partly breaks the light pulse; and
    reading the number with an external device using the NFC component.

15. The method of claim 14, wherein measuring the pressure level of the counted fluid pulses by an amount of a partly broken light pulse; and

- the amount of the partly broken light pulse and/or the pressure level are/is stored in the memory.

16. The method of claim 13, further comprising:

- extending the battery life of the pulse counter by sending the light pulse between the light pulse transmitter and the light pulse receiver less frequent than once every second; and
- setting the duration of the light pulse less than one micro second; or
- wherein the light pulse between the light pulse transmitter and the light pulse receiver is sent once every third second, or less frequently, and wherein the duration of the light pulse is less than one nano second.

17. The method of claim 13, further comprising extending the battery life of the pulse counter by sending a light pulse between the light pulse transmitter and the light pulse receiver less frequently than once every three seconds; and

- wherein the duration of the light pulse is less than one nano second.

\* \* \* \* \*